Oct. 24, 1961 F. BADER 3,005,308
VARIABLE AREA NOZZLE ARRANGEMENT
Filed Aug. 25, 1952 3 Sheets-Sheet 2
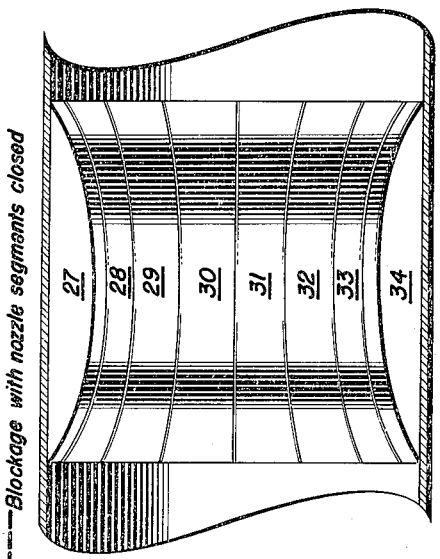
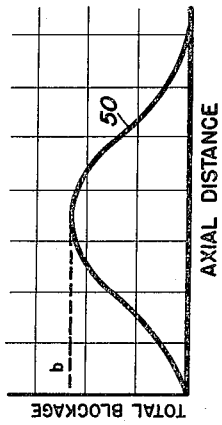
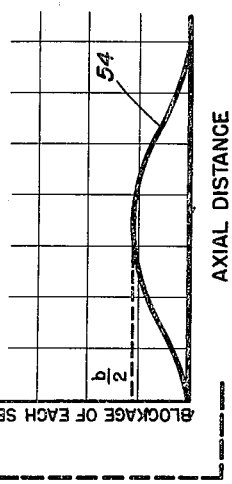
*FIG. 4.*
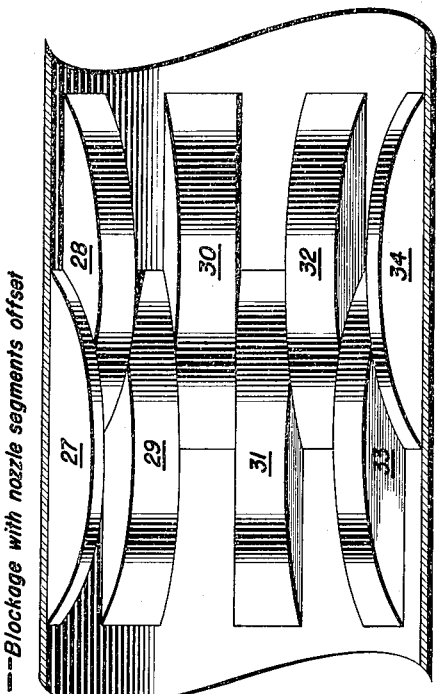
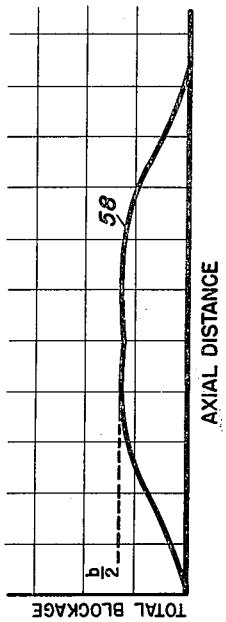
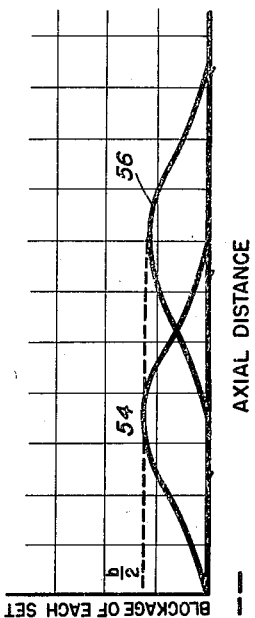
*FIG. 5.*
INVENTOR
FRANK BADER
BY
ATTORNEYS Oct. 24, 1961 F. BADER 3,005,308
VARIABLE AREA NOZZLE ARRANGEMENT
Filed Aug. 25, 1952 3 Sheets-Sheet 3
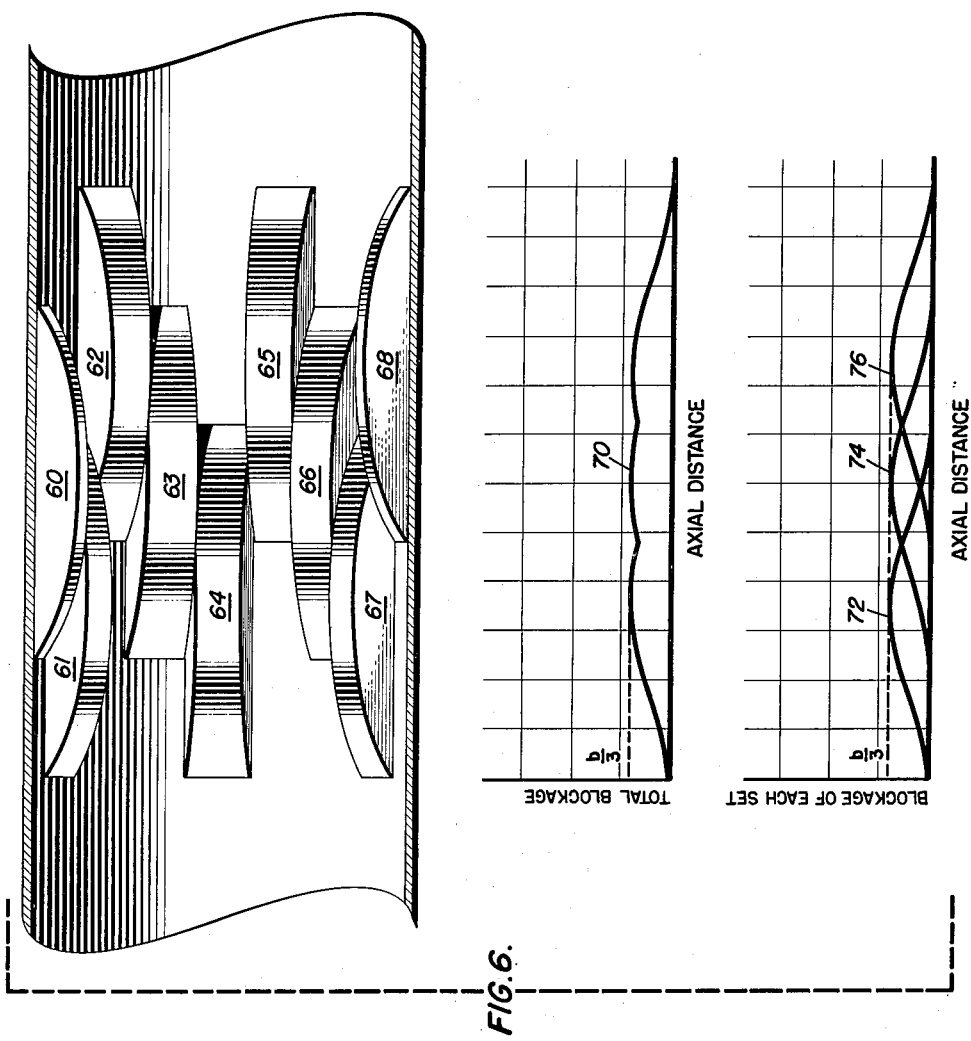
*INVENTOR*
FRANK BADER
BY
*ATTORNEYS*

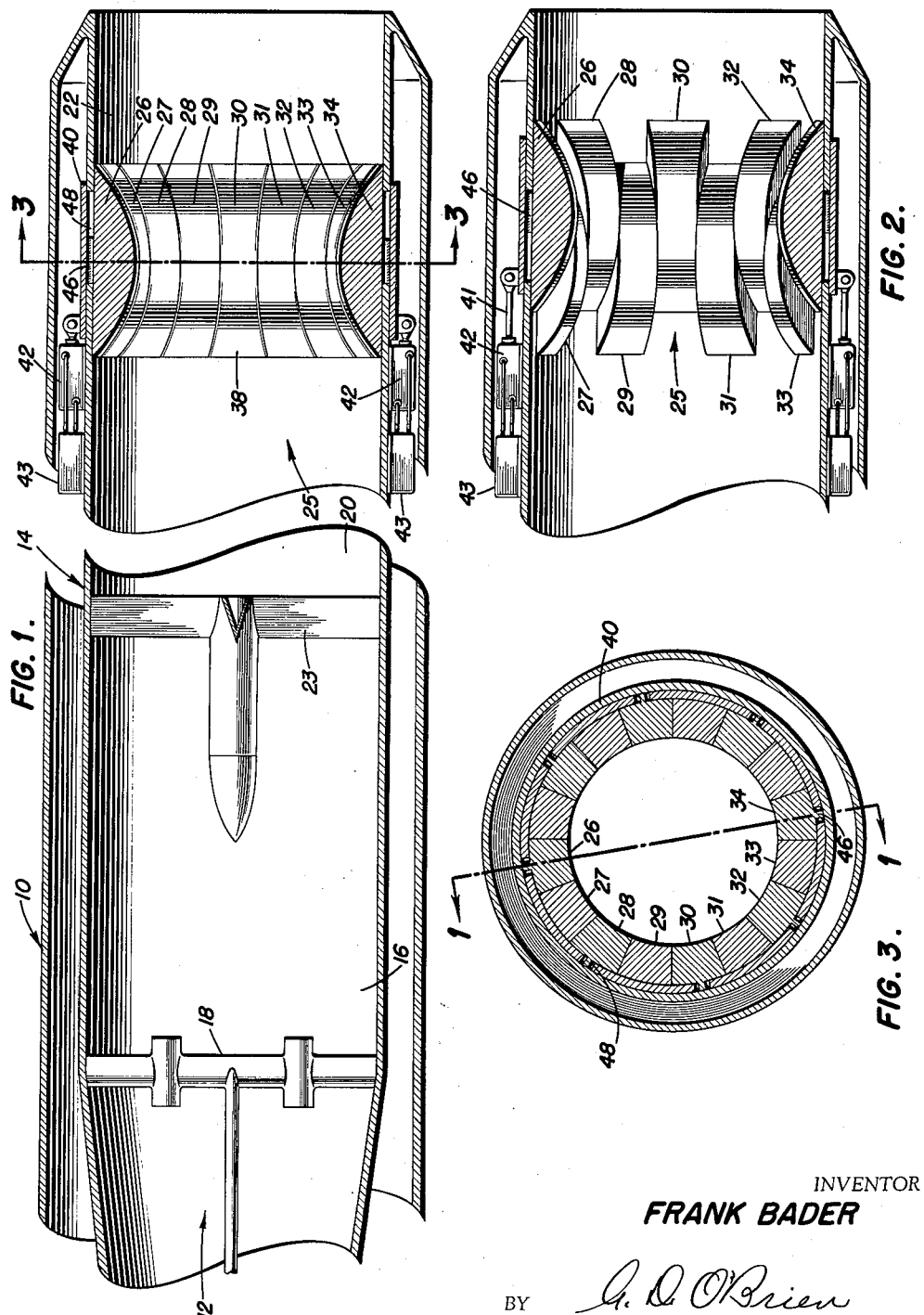

United States Patent Office 3,005,308
Patented Oct. 24, 1961

3,005,308
VARIABLE AREA NOZZLE ARRANGEMENT
Frank Bader, Silver Spring, Md., assignor to the United States of America as represented by the Secretary of the Navy
Filed Aug. 25, 1952, Ser. No. 306,261
6 Claims. (Cl. 60—35.6)

This invention relates generally to aerial missiles. More particularly, it relates to a variable area exit nozzle arrangement for aerial missile ramjet engines.

In the development of ramjet engines for use with aerial missiles, it has been determined that large throat area exit nozzles are desirable for missiles flying at low mach numbers or high engine thrust coefficients, while small throat area exit nozzles are preferable for missiles flying at high mach numbers or low engine thrust coefficients.

Some ramjet engines, for instance, such as those used with anti-aircraft missiles, must operate over a considerable range of flight speeds, and must provide, therefore, a range of thrust coefficients varying by a factor greater than two (2).

It is one of the objects of this invention, therefore, to provide a variable area exit nozzle arrangement which can be utilized to give satisfactory performance and efficiency over a considerable range of flight speeds, and which provides a range of thrust coefficients varying by a factor greater than two (2).

Another object of the invention is to provide a variable area exit nozzle arrangement for controlling the throat area at the exit of a ramjet combustor in order to match this area to the presure, mass flow and temperature available at the combustor exit.

And a further object of the invention is to provide a nozzle area exit arrangement for varying the throat exit area of a ramjet combustor exit nozzle.

Other objects and many of the attendant advantages of this invention will be readily appreciated as the same becomes better understood by reference to the following detailed description when considered in connection with the accompanying drawings wherein:

FIG. 1 is a longitudinal sectional view on line 1—1 of FIG. 3 of a ramjet engine, embodying a first embodiment of the nozzle area exit arrangement in unextended condition;

FIG. 2 is a fragmentary section of the invention shown in FIG. 1, and particularly showing the nozzle area exit arrangement in extended condition;

FIG. 3 is a cross-section on line 3—3 of FIG. 1;

FIG. 4 is a curve showing nozzle area blockage in one plane for the arrangement shown in FIG. 1;

FIG. 5 shows curves of nozzle area blockage in two planes for the arrangement shown in FIG. 2; and FIG. 6 shows a second embodiment of the nozzle arrangement, with the nozzle segments offset unequal distances along the longitudinal axis of the missile.

In accordance with the invention, an aerial missile of the ramjet type is provided, in one embodiment of the invention with a variable area exit nozzle arrangement which includes a group of fixed nozzle segments and a group of movable nozzle segments. An intelligence means is provided to determine when the thrust of the ramjet should be varied or changed in accordance with operating requirements. A control signal from the intelligence unit is used to control a servo means for moving the movable nozzle segments in a longitudinal direction with respect to the fixed segments. The outer surface of the nozzle segments of each group are arcuate-shaped as presented to the longitudinal axis of the missile. The nozzle segments of one group can be offset equal distances from the nozzle segments of the other group. In a second embodiment of the invention, however, the nozzle segments of one group are offset unequal distances from the nozzle segments of the other or other groups. When the movable segments are moved in a forward direction, they mesh with the fixed segments like staves of a barrel to present a reduced nozzle throat area. However, when the movable segments are moved rearwardly, the effective nozzle throat area is increased. The amount of forward or rearward movement of the nozzle segments will depend upon the signal received by the intelligence unit.

By constructing the nozzle of several segment groups (two groups or more), such that the segments of one group can be displaced from those of the other group, it is possible to produce the maximum blockage in one plane, and thus control the exit throat area of the minimum section of the ramjet engine nozzle. When the nozzle segments are utilized as mentioned above they are contoured to form a continuous smooth nozzle with a minimum loss.

Reference is now made to the drawings for a more detailed description of the invention. In FIG. 1, there is illustrated a portion of a ramjet engine 10 having a nose assembly section (not shown), a frusto-conical diffuser section 12, and a combustor 14. Combustor 14 is generally divided into three sections, that is, a section 16 for mixing together the air stream from diffuser section 12 with the fuel injected into the air stream by nozzle arrangement 18, a combustion chamber section 20 for the ignition and combustion of the fuel mixture, and an exit area nozzle section 22 through which the hot gases developed in chamber section 20 expand at a velocity higher than the entering air stream to provide the thrust force for movement of the aerial missile along its trajectory. Combustor section 20 usually has a flame holder 23, including a spark igniter source for igniting the fuel mixture.

It is this exit area nozzle section 22 with which this invention is particularly concerned. Instead of using annular rings or the like to form variable area exit converging or converging-diverging exit nozzles for a ramjet combustor, this invention provides a variable area exit nozzle arrangement 25 in which use is made of nozzle formed of groups of fixed and movable segments. The fixed groups of segments comprises segments 27, 29, 31, 33 and so forth, while the movable group of segments comprises segments 26, 28, 30, 32 34, and so forth. All of these segments are shown in the unextended condition of the nozzle arrangement 25 in FIG. 1, and in the extended condition in FIG. 2. The convex exposed (inner) surface 38 of each segment is bowed with respect to the longitudinal axis of the ramjet engine. For purposes of clarification, nozzle arrangement 25 can be compared to a barrel composed of a number of staves.

As indicated in FIG. 2, segment group 26 is shown displaced with respect to segment group 27. Thus, the blockage in a given plane is reduced. Segment group 26 can be moved forwardly or rearwardly with respect to segment group 27 by means of an annular ring member 40 which is actuated through a connecting member 41 by a servo-mechanism 42. Servo mechanism 42 is actuated by a control signal from an intelligence unit 43, which determines the magnitude of the thrust requirements of the ramjet, and variations thereof.

A connecting member, such as 46, extends from each segment, such as 26, through a slot, such as 48, to ring member 40. Thus, when ring member 40 is moved rearwardly by servo-mechanism 42, it moves segment group 26 rearwardly, as shown best in FIG. 2.

Referring now to FIGS. 4 and 5, there are illustrated curves showing the effect of nozzle blockage as a function of displacement of the movable nozzle segments 26, 28, in a longitudinal direction with respect to the fixed nozzle segments 27, 29.

The curve 50 in FIG. 4 shows the condition corresponding to the nozzle arrangement shown in FIG. 1. Here for the area blockage in one plane, corresponding to the nozzle segments 26, 27, 28, and so forth, in alignment or unextended condition, the nozzle blockage factor is given by the "$b$." For the condition of area blockage in two planes that is corresponding to segment group 26 moved rearwards, as shown in FIG. 2, the nozzle area blockage factor for each group of nozzle segments 26 and 27 is given by curves 54 and 56, with curve 58 being the summation of curves 54 and 56, shown in FIG. 5. It is to be observed that the ordinate of curve 58 in FIG. 5, is exactly one-half of that for curve 50 in FIG. 4, that is, the nozzle area blockage factor is given by "$b/2$."

The nozzle segments can be offset unequal distances from each other, instead of equal distances such as shown in FIG. 2, to obtain a greater reduction in blockage required. For example, instead of using two groups of segments, three or more groups of segments can be used, such as 60, 63, and 66; 61, 64, and 67; and 62, 65, and 68, as shown in FIG. 6, with the segments of each group being controlled by its own mechanism, such as that shown for the moving group of segments in FIG. 2, to displace each group of segments in a staggered fashion in the longitudinal direction. It is to be noted that the segments of one group are offset an unequal distance in the longitudinal direction with respect to the segments of another group. For example, the nozzle segments 61, 64, and 67 of one group, are offset or can be offset an unequal distance from the nozzle segments 60, 63, and 64 of another group and so forth. FIG. 6 also includes a curve 70 of total blockage versus axial distance for the three groups of segments illustrated therein. Curve 70 is obtained by summing the ordinates of curves 72, 74, and 76, which represent the blockage of each set of segments 60, 63, and 66; 61, 64, and 67; and 62, 65, and 68, respectively.

Thus, by varying the number of nozzle segments, as well as the shape of the nozzle segments, it is possible to vary the nozzle area throat exit of a ramjet engine to correspond to the pressure, mass flow and temperature available at the combustor exit, and the Mach number at which the aerial missile will be flying.

In actual operation, the aerial missile 10 after being launched from a launching platform (not shown), by means of a booster arrangement, continues along its trajectory until sufficient speed is obtained and the booster arrangement has spent its energy. The booster arrangement is released by suitable means, and the missile 10 continues along its course. Any variations in thrust requirement are detected by means of the intelligence unit 43. A control signal therefrom is used to actuate a servo-mechanism 42, which, in turn, moves the movable group of nozzle segments 26, 28, 30, 32, 34 and so forth, either towards or away from the fixed group of nozzle segments 27, 29, 31, 33, and so forth, to either decrease or increase the effective nozzle throat area in the ramjet missile 10 in order to compensate for the required thrust for operation thereof.

The nozzle arrangement described above can be utilized for the same purpose with other types of jet engines, such as rockets, turbo-jets, and other similar types of power plants.

Obviously many modifications and variations of the present invention are possible in the light of the above teachings. It is therefore to be understood that within the scope of the appended claims the invention may be practiced otherwise than as specifically described.

What is claimed is:

1. In combination with an aerial vehicle of the jet or ramjet types, a variable area exit nozzle arrangement for the jet, comprising, a group of fixed nozzle segments, a group of longitudinally movable nozzle segments, the nozzle segments of one group being alternately arranged with respect to the nozzle segments of the other group, the outer surfaces of said nozzle segments of each group being arcuate-shaped as presented to the longitudinal axis of said vehicle, and means for longitudinally moving said movable group of nozzle segments with respect to said fixed group of nozzle segments.

2. In combination with an aerial vehicle of the jet or ramjet types, a variable area exit nozzle arrangement for the jet, comprising, a group of fixed nozzle segments, a group of movable nozzle segments, the nozzle segments of one group being alternately arranged with respect to the nozzle segments of the other group, the nozzle segments of one group being displaced along the longitudinal axis of said vehicle unequal distances from the nozzle segments of the other group, and means for moving said movable group of nozzle segments with respect to said fixed group of nozzle segments.

3. In combination with an aerial vehicle of the jet or ramjet types, a variable area exit nozzle arrangement for the jet, comprising, a group of fixed nozzle segments, a group of movable nozzle segments, the nozzle segments of one group being alternately arranged with respect to the nozzle segments of the other group, the nozzle segments of one group being displaced along the longitudinal axis of said vehicle equal distances from the nozzle segments of the other group, and means for moving said movable group of nozzle segments with respect to said fixed group of nozzle segments.

4. A variable area exit nozzle arrangement for an aerial vehicle of the jet or ramjet type, comprising, a group of fixed nozzle segments, and a plurality of groups of movable nozzle segments, the nozzle segments of each group being alternately arranged with respect to the nozzle segments of the remaining groups, the outer surfaces of said nozzle segments of each group being arcuate-shaped as presented to the longitudinal axis of said vehicle, said groups of movable nozzle segments being arranged to be displaced along the longitudinal axis of said vehicle from each other in a staggered arrangement.

5. An arrangement as set forth in claim 4, wherein the nozzle segments of the movable groups are displaced along the longitudinal axis of said vehicle unequal distances from the nozzle segments of the fixed group.

6. An arrangement as set forth in claim 4, wherein the nozzle segments of the movable groups are displaced along the longitudinal axis of said vehicle equal distances from the nozzle segments of the fixed group.

References Cited in the file of this patent

UNITED STATES PATENTS

| | | |
|---|---|---|
| 851,603 | Long | Apr. 23, 1907 |
| 2,514,248 | Lombard et al. | July 4, 1950 |
| 2,575,735 | Servanty | Nov. 20, 1951 |
| 2,590,272 | Robertson | Mar. 25, 1952 |
| 2,612,747 | Skinner | Oct. 7, 1952 |
| 2,669,834 | Helms | Feb. 23, 1954 |
| 2,700,989 | Benedetti | Feb. 1, 1955 |